US007226283B2

(12) United States Patent
Babin

(10) Patent No.: US 7,226,283 B2
(45) Date of Patent: Jun. 5, 2007

(54) INJECTION MOLDING APPARATUS WITH A MELT CHANNEL IN VALVE PIN

(75) Inventor: Denis Babin, Georgetown (CA)

(73) Assignee: Mold-Masters Limited, Georgetown, Ontario (CA)

( * ) Notice: Subject to any disclaimer, the term of this patent is extended or adjusted under 35 U.S.C. 154(b) by 392 days.

(21) Appl. No.: 10/962,551

(22) Filed: Oct. 13, 2004

(65) Prior Publication Data

US 2006/0078644 A1 Apr. 13, 2006

(51) Int. Cl.
*B29C 45/23* (2006.01)

(52) U.S. Cl. ...................................... 425/564; 425/566

(58) Field of Classification Search ................ 425/562, 425/563, 564, 565, 566

See application file for complete search history.

(56) References Cited

U.S. PATENT DOCUMENTS

| | | | | |
|---|---|---|---|---|
| 3,553,788 | A | 1/1971 | Putkowski | |
| 4,521,179 | A | 6/1985 | Gellert | |
| 4,902,218 | A | 2/1990 | Leonard et al. | |
| 4,925,384 | A | 5/1990 | Manner | |
| 5,049,062 | A | 9/1991 | Gellert | |
| 5,162,125 | A | 11/1992 | Akselrud et al. | |
| 5,238,378 | A | 8/1993 | Gellert | |
| 5,324,190 | A | 6/1994 | Frei | |
| 5,324,191 | A | 6/1994 | Schmidt | |
| 5,830,524 | A | 11/1998 | Braun | |
| 5,851,571 | A | 12/1998 | Manner | |
| 5,900,200 | A * | 5/1999 | Teng | 425/564 |
| 5,955,120 | A | 9/1999 | Deissler | |
| 6,270,711 | B1 | 8/2001 | Gellert et al. | |
| 7,018,198 | B2 * | 3/2006 | Lebreton | 425/564 |
| 2003/0224086 | A1 | 12/2003 | Olaru | |
| 2004/0131721 | A1 | 7/2004 | Babin et al. | |

FOREIGN PATENT DOCUMENTS

| | | | |
|---|---|---|---|
| EP | 0 779 683 | A2 | 10/1997 |
| EP | 0 800 907 | A1 | 10/1997 |
| EP | 0 800 907 | B1 | 4/2001 |
| JP | 55-61438 | | 5/1980 |

* cited by examiner

*Primary Examiner*—Tim Heitbrink
(74) *Attorney, Agent, or Firm*—Medler Ferro PLLC

(57) ABSTRACT

An injection molding apparatus includes a manifold with a manifold melt channel, a nozzle with a nozzle channel and a valve pin with an outer surface in proximal to an inner surface of the nozzle channel. A valve pin melt channel is defined by and substantially coaxial to the valve pin. The valve pin melt channel communicates with the manifold melt channel when the valve pin is retracted and is restricted from the manifold melt channel when the valve pin is extended. A mold gate is open when the valve pin is retracted and is closed by a valve pin tip of the valve pin when the valve pin is extended. An outlet extends from a longitudinal portion of the valve pin melt channel to the surface of the valve pin adjacent to the valve pin tip and is in continuous communication with a well adjacent the mold gate.

38 Claims, 4 Drawing Sheets

10 I 50 44 40 68 46 30 67 62 64 66 69 42 C 70 54 56

INJECTION MOLDING APPARATUS WITH A MELT CHANNEL IN VALVE PIN

FIELD OF THE INVENTION

The present invention relates generally to an injection molding apparatus and, in particular to a valve gated nozzle and valve pin arrangement for an injection molding apparatus.

BACKGROUND OF THE INVENTION

In a valve gated injection molding apparatus, a valve pin reciprocates through a nozzle to open and close a mold gate forming an opening to a mold cavity. Improper alignment of the valve pin with the mold gate may result in leaking at the mold gate, which may cause blemishes around the gate area of the molded part. Further, improper valve pin alignment may result in damage to or pre-mature wear of the valve pin and/or the mold gate. Such damage necessitates frequent repair or replacement of the valve pin and/or mold gate components, which can be costly.

Solutions for improving valve pin alignment have typically included a guide positioned towards the downstream end of the nozzle melt channel to capture and align the free end of the valve pin before it exits the nozzle and enters the mold gate. Because melt is required to flow past the guide when the valve pin is in the open position, a plurality of circumferentially spaced slots are typically provided in either the valve pin or the guide for melt to move around the valve pin and valve guide. A disadvantage of this arrangement is that the melt flow in the nozzle melt channel must separate to pass around the guide means, and subsequently reunite downstream of the guide, which may cause weld lines to appear in the molded product. Furthermore, having a guide in the nozzle melt channel typically causes melt stream color changes in the injection molding apparatus to be less efficient.

Further, many injection molding applications include a plurality of hot runner nozzles that are arranged closely with one another, i.e., having a tight pitch. These hot runner nozzles may have melt channels with very small diameters. Valve pin gating presents several challenges in small diameter hot runner nozzles. For example, the valve pin diameter must be sized to allow sufficient space for the melt to flow between the pin and the melt channel. If the flow restriction is too great, the injection pressure required must be increased and, as a result, the shear on the melt stream may cause overheating and degradation of the melt material. However, a valve pin that would not cause a significant flow restriction would likely be weak and subject to damage during use due to its extremely small diameter.

Solutions for improving a nozzle channel of a small diameter nozzle include carving a groove into an exterior of the valve pin to create a nozzle melt channel defined between the nozzle channel inner surface and the groove of the valve pin. However, these grooves do not define clear melt channels since the valve pins move with respect to the nozzle channel. Often these grooves do not provide symmetric heat distribution to the melt channel because the channel is not positioned along an axis of the nozzle, which can cause uneven temperatures in the melt.

SUMMARY OF THE INVENTION

The present invention includes a valve pin and nozzle arrangement in which a valve pin melt channel is defined by and coaxial with the valve pin. The close proximity of the valve pin to the nozzle channel allows the nozzle channel to continuously guide the valve pin as it extends and retracts so as to align the valve pin with the mold gate. The valve pin can be thick enough to avoid bending or being damaged as it reciprocates within the nozzle channel. This arrangement also provides symmetrical heating of the valve pin melt channel and no obstructions or frictional forces caused by either the valve pin or valve pin guides within the melt channel. As such, the arrangement reduces flow lines or uneven melt temperatures.

In an embodiment of the present invention an injection molding apparatus includes a manifold having a manifold melt channel, a nozzle coupled to the manifold and having a nozzle channel, and a valve pin. The valve pin is reciprocally movable through the nozzle channel and includes a valve pin melt channel substantially including a longitudinal portion defined by and substantially coaxial to the valve pin. The valve pin melt channel communicates with the manifold melt channel. The valve pin melt channel includes an outlet that extends from the longitudinal portion of the valve pin melt channel to an outer surface of the valve pin. The outlet is positioned such that the outlet is not blocked despite a position of the valve pin.

In another embodiment of the present invention, an injection molding apparatus includes a manifold having a manifold melt channel, a nozzle coupled to the manifold and having a nozzle channel and a valve pin. The valve pin has a retracted position and is reciprocally movable through the nozzle channel to an extended position. The valve pin includes a valve pin melt channel defined by and substantially coaxial to the valve pin. An inlet of the valve pin melt channel selectively communicates with the manifold melt channel when the valve pin is in the retracted position and is restricted from communicating with the manifold melt channel when the valve pin is in the extended position.

In another embodiment of the present invention, an injection molding apparatus includes a manifold having a manifold melt channel, a nozzle coupled to the manifold and having a nozzle channel and a valve pin. The valve pin has a retracted position and is reciprocally axially movable through the nozzle channel of the nozzle to an extended position. The valve pin includes a valve pin melt channel substantially including a longitudinal portion defined by and coaxial to the valve pin and has an outer surface in close proximity to an inner surface of the nozzle channel. An inlet of the valve pin melt channel selectively communicates with the manifold melt channel when the valve pin is in the retracted position and is restricted from communicating with the manifold melt channel when the valve pin is in the extended position. The injection molding apparatus also includes a mold gate to a mold cavity. The mold gate is open when the valve pin is in the retracted position and is closed by a valve pin tip of the valve pin when the valve pin is in the extended position. The valve pin melt channel includes an outlet extending from the longitudinal portion of the valve pin melt channel to the outer surface of the valve pin. The outlet is adjacent to the valve pin tip and is positioned such that said outlet is not blocked despite the position of said valve pin.

In another embodiment of the present invention, an injection molding apparatus includes a manifold having a manifold melt channel, a nozzle having a nozzle channel and a valve pin. The nozzle is coupled to a valve pin bushing positioned between the manifold and the nozzle. The valve pin bushing has a bushing melt channel with an inlet and an outlet. The inlet communicates with the manifold melt channel. The valve pin has a retracted position and is reciprocally axially movable through the nozzle channel of the nozzle to an extended position. The valve pin includes a valve pin melt channel defined by and substantially coaxial to the valve pin. The valve pin melt channel selectively communicates with the outlet of the bushing melt channel when the valve pin is in the retracted position and is restricted from communicating with the outlet of the bushing melt channel when the valve pin is in the extended position. The apparatus includes a mold gate to a mold cavity. The mold gate is open when the valve pin is in the retracted position and is closed by a valve pin tip of the valve pin when the valve pin is in the extended position. The valve pin melt channel includes an outlet extending from a longitudinal portion of the valve pin melt channel to the outer surface of the valve pin. The outlet is adjacent to the valve pin tip and is positioned such that the outlet is not blocked despite the position of said valve pin.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
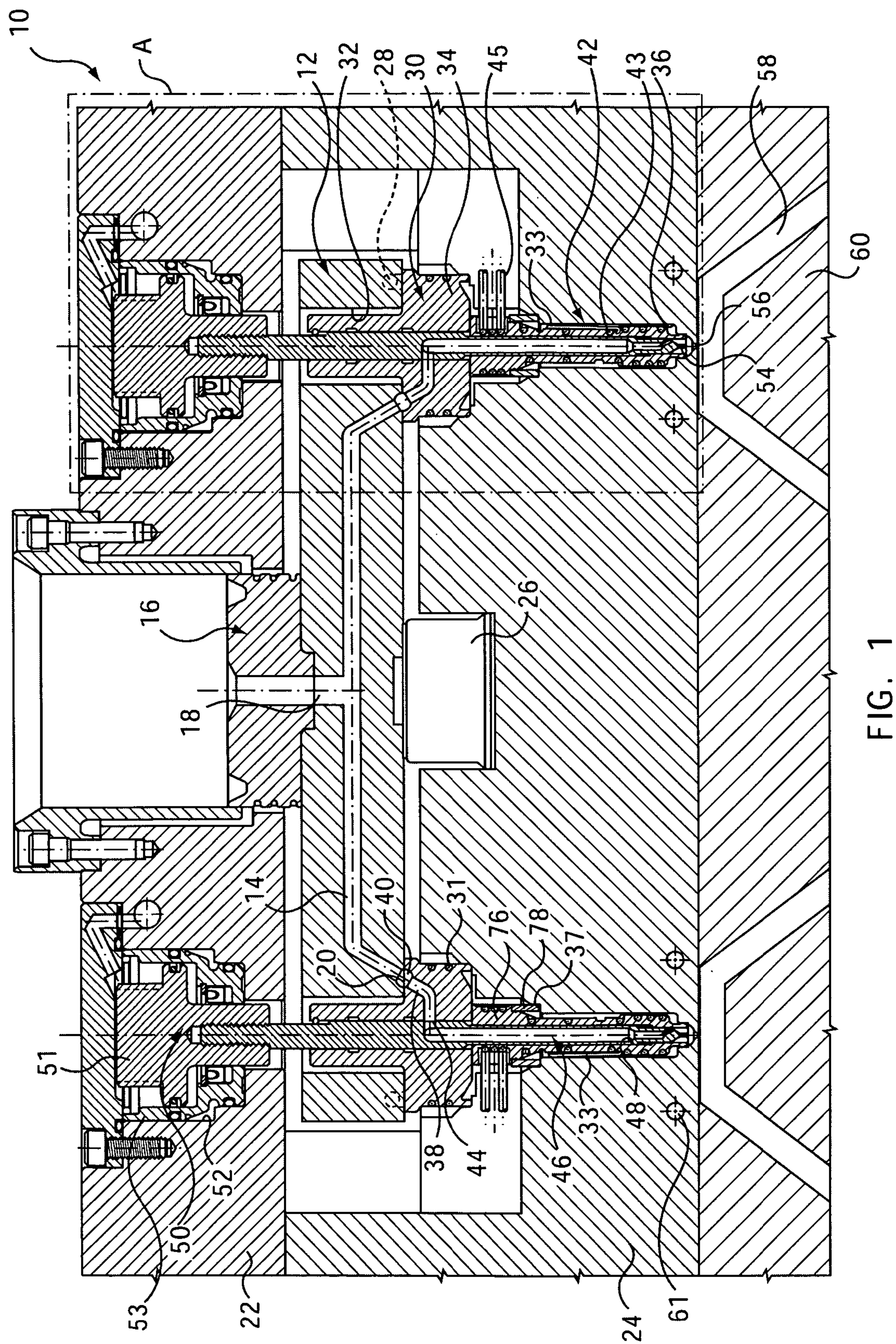
FIG. 1 is a side sectional view of an injection molding apparatus according to an embodiment of the present invention.

Referring now to FIG. 1, an injection molding apparatus is generally shown at 10. Injection molding apparatus 10 includes a manifold 12, which is spaced between a back plate 22 and a mold plate 24. Manifold 12 is located relative to mold plate 24 by a locating ring 26. A sprue bushing 16 is coupled to an inlet 18 of manifold 12. Sprue bushing 16 receives melt from a machine nozzle (not shown) and delivers melt through inlet 18 to a manifold channel 14 of manifold 12. Melt travels through manifold channel 14 and exits manifold 12 through one or more manifold outlets 20. Manifold 12 is heated by a manifold heater 28.

A valve pin bushing 30 is received in an aperture 32, which is provided in manifold 12 for each of the one or more manifold outlets 20. Valve pin bushing 30 includes an enlarged downstream portion 34 that is positioned between manifold 12 and a nozzle 42, which is received in an opening 36 in mold plate 24. A nozzle head 76 of nozzle 42 is maintained in abutment with enlarged downstream portion 34 of valve pin bushing 30 by a collar 78 that is provided between a shoulder 37 of opening 36 and nozzle head 76. A heater 43 heats nozzle 42 and communicates with a power source (not shown) through a connector 45. A thermocouple 33 is used to measure the temperature and provide feedback to a controller (not shown) which increases or decreases the power output to the heater 43 to raise or lower the temperature of the nozzle 42 and as a result the melt stream.

A bushing melt channel 38 extends through enlarged downstream portion 34 of valve pin bushing 30. Bushing melt channel 38 includes a bushing melt channel inlet 40, which is aligned with one of manifold outlets 20, and a bushing melt channel outlet 44. Valve pin bushing 30 is heated by a heater 31, which communicates with a power source (not shown) through a connector (not shown). A thermocouple (not shown) may be located in the valve pin bushing 30 to provide feedback to a controller (not shown) which increases or decreases the power output to the heater 31 to raise or lower the temperature of the valve bushing 30 and as a result the melt stream. It may also be possible to use the thermocouple 33 in the nozzle 42 to control the power output to the heater 31 in the valve bushing 30.

A valve pin 46 extends through a nozzle channel 48 of nozzle 42 and is axially movable by an actuator 50. Actuator 50 is a piston 51 and cylinder 53 arrangement received in a actuator housing 52 provided in back plate 22. Piston 51 of actuator 50 reciprocates valve pin 46 through nozzle channel 48 to move a valve pin tip 54 into and out of engagement with a mold gate 56 to selectively open and close mold gate 56 of a mold cavity 58. In FIG. 1, valve pin 46 is shown in a retracted position in which valve pin tip 54 does not engage mold gate 56. Mold cavity 58 is provided between mold plate 24 and a mold core 60. Mold cavity 58 is cooled by cooling channels 61.

Figure 2:
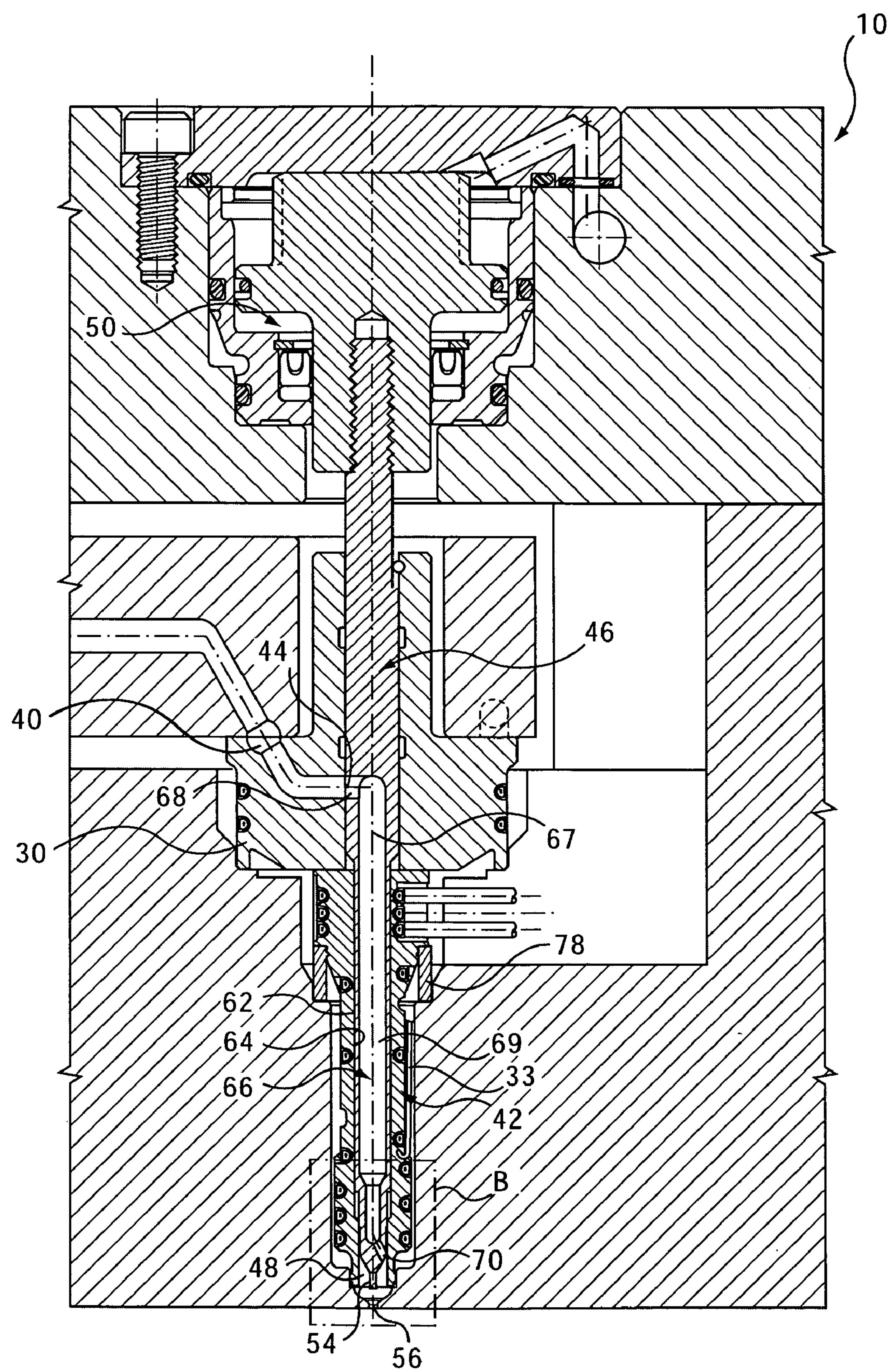
FIG. 2 is an enlarged view of portion A of FIG. 1.
Figure 3:
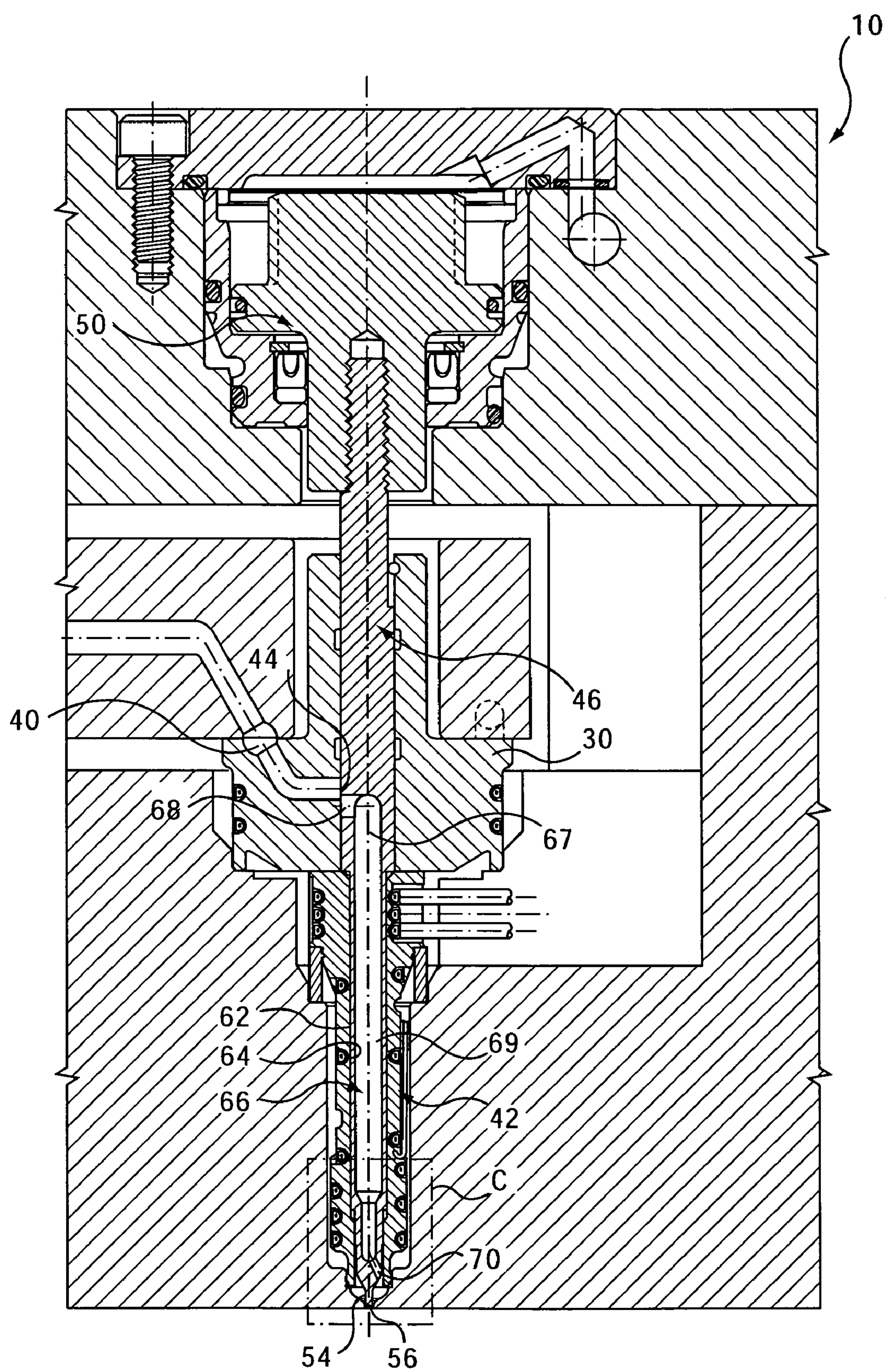
FIG. 3 is a view similar to FIG. 2 with a valve pin in an extended position.
Figure 4:
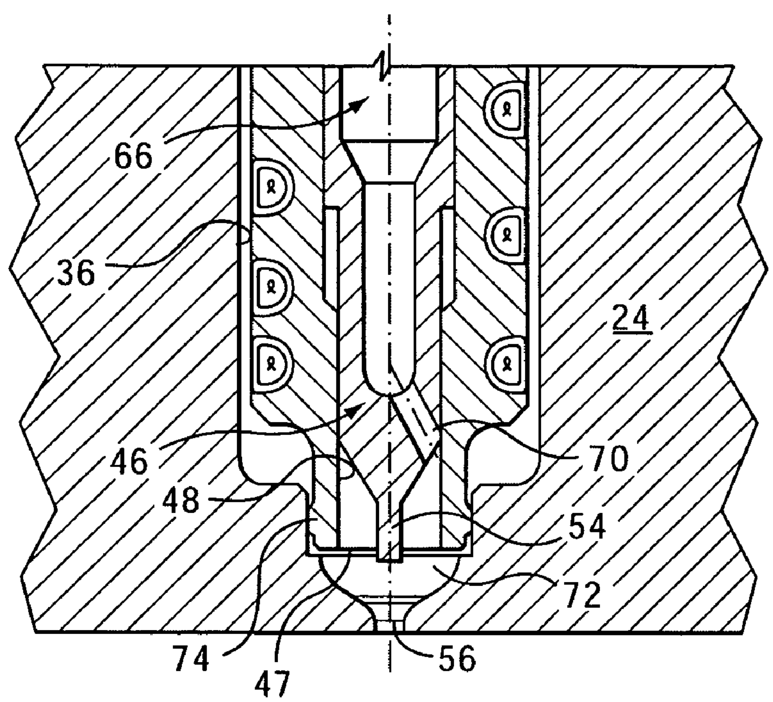
FIG. 4 is an enlarged view of portion B of FIG. 2.

Referring now to FIGS. 2 and 3, a valve pin melt channel 66 extends through a portion of valve pin 46. Valve pin melt channel 66 has a substantial longitudinal portion 69 substantially defined by valve pin 46 about an axis 67 of valve pin 46, such that valve pin melt channel 66 and valve pin 46 are substantially coaxial. Valve pin melt channel 66 includes an inlet 68 and an outlet 70. Outlet 70 is a radial or oblique bore located adjacent to valve pin tip 54. Inlet 68 is a radial or oblique bore extending from longitudinal portion 69 of valve pin melt channel 66 to an outer surface 62 of valve pin 46 adjacent to the valve pin bushing 30. Inlet 68 is aligned with bushing melt channel outlet 44 of valve pin bushing 30 when valve pin 46 is in a retracted position, as shown in FIGS. 1 and 2. In the retracted position, valve pin tip 54 is spaced from mold gate 56 to permit melt flow therethrough, as shown in FIG. 4. Having a melt channel disposed within valve pin 46 allows valve pin 46 to have an outer diameter thick enough to withstand reciprocal movement without bending or damaging.

Valve pin 46 is sized to slide within close proximity to nozzle channel 48. Clearance between an outer surface 62 of valve pin 46 and an inner surface 64 of nozzle channel 48 is minimized in order to generally prevent melt from leaking therebetween. Also, the clearance between valve pin 46 and the inner surface 64 is minimized. Valve pin 46 in close proximity to nozzle 42 provides that valve pin 46 is guided along substantially the entire the length of nozzle 42, that valve pin tip 54 is directed into alignment with mold gate 56, and that heat is transferred from the nozzle 42 through valve pin 46 and into melt within valve pin melt channel 66. In one embodiment of this invention, there is continuous contact between valve pin 46 and an inner surface 64 of nozzle channel 48. To improve wear resistance of valve pin 46 and nozzle 42, a nitride coating, such as titanium nitride or chrome nitride, for example, may be applied to valve pin outer surface 62 and/or inner surface 64 of nozzle channel 48.

Figure 5:
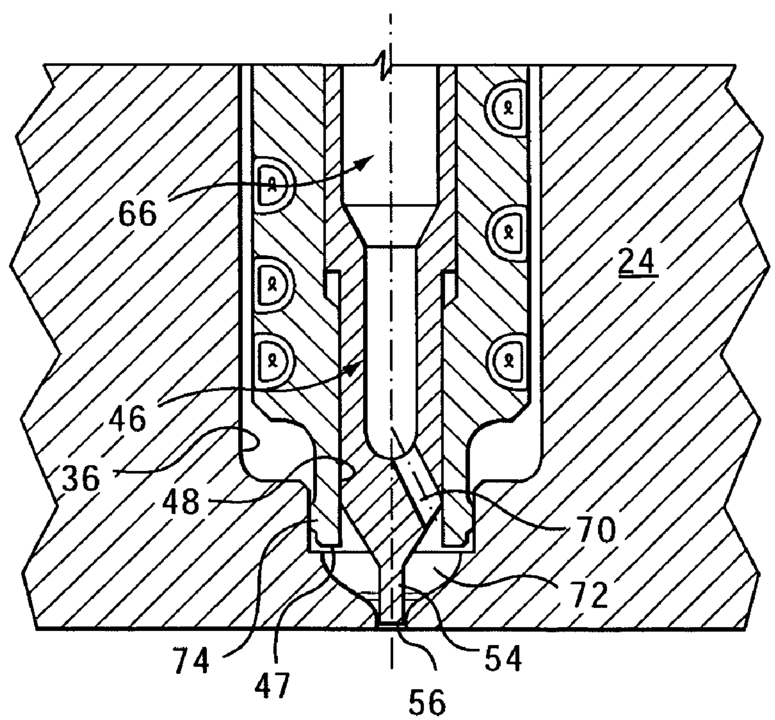
FIG. 5 is an enlarged view of portion C of FIG. 3.

Valve pin 46 is movable between the retracted position of FIGS. 1 and 2 and an extended position, as shown in FIG. 3. When valve pin 46 is in the extended position, communication between inlet 68 of melt channel 66 and bushing melt channel outlet 44 of valve pin bushing 30 is interrupted because outer surface 62 of valve pin 46 seals off bushing melt channel outlet 44 and generally prevents melt from escaping therefrom. Further, in the extended position, mold gate 56 is blocked because valve pin tip 54 is seated in mold gate 56, as shown in FIG. 5. When valve pin 46 is in the retracted position, melt flows through mold gate 56.

As shown in FIGS. 4 and 5, a melt chamber 72 is defined in the mold plate 24 adjacent mold gate 56. However, in some embodiments, for example in color change applications, melt channel 72 may not exist in order to avoid colored melt material collecting in this area. Forward flange 74 contacts mold plate 24 to seal off melt chamber 72 from opening 36.

Outlet 70 of valve pin melt channel 66 is a bore in valve pin which extends from valve pin melt channel 66 to outer surface 62 of valve pin 46 that is adjacent to valve pin tip 54. In other embodiments, valve pin melt channel 66 may have more than one outlet, similar to outlet 70, or opposed radial outlets formed from a single bore through valve pin 46 intersecting longitudinal portion 69 of valve pin melt channel 66. Outlet 70 remains in continuous fluid communication with a forward opening 47 of nozzle channel 48 when valve pin 46 is in both the retracted position and the extended position. As such, outlet 70 is positioned such that melt material is not blocked from flowing from outlet 70 of valve pin melt channel 66 despite the position of valve pin 46. Further, inlet 68, longitudinal portion 69 and outlet 70 of valve pin melt channel 66 form a single channel such that a stream of melt material flowing within said valve pin melt channel is not divided as it flows towards mold gate 56.

Valve pins 46 begin each molding cycle in the retracted position of FIGS. 1, 2 and 4. The machine nozzle then injects melt through sprue bushing 16 into manifold channel 14 of manifold 12. Manifold channel 14 distributes melt to bushing melt channel 38 of valve pin bushing 30. From bushing melt channel outlet 44, melt flows into melt channel inlet 68 of valve pin 46, which is aligned with bushing melt channel outlet 44. Melt flows from melt channel outlet 70 of valve pin melt channel 66, through mold gate 56 and fills mold cavity 58. Valve pin 46 then moves to the extended position in order to restrict melt flow from bushing melt channel 38 into melt channel 66 of valve pin 46 and to seat valve pin tip 54 in mold gate 56 to stop melt from flowing into mold cavity 58. Following injection, mold cavity 58 is cooled and a molded part is ejected from injection molding apparatus 10. The cycle repeats when mass producing molded parts.

It will be appreciated by persons skilled in the art that actuator 50 may be pneumatic, hydraulic or electric or may be a type of actuator other than a piston and cylinder actuator as may be apparent to one skilled in the art.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:

a manifold having a manifold melt channel;

a nozzle coupled to said manifold and having a nozzle channel; and a valve pin reciprocally movable through said nozzle channel and including a valve pin melt channel substantially including a longitudinal portion defined by and coaxial with said valve pin, wherein said valve pin melt channel communicates with said manifold melt channel;

wherein said valve pin melt channel includes an outlet extending from said longitudinal portion of said valve pin melt channel to an outer surface of said valve pin and wherein said outlet is positioned such that said outlet is not blocked despite a position of said valve pin.

2. The injection molding apparatus of claim 1, wherein said outlet extends obliquely from said longitudinal portion of said valve pin melt channel.

3. The injection molding apparatus of claim 1, wherein said outlet extends radially from said longitudinal portion of said valve pin melt channel.

4. The injection molding apparatus of claim 1, wherein said outer surface of said valve pin is in close proximity to an inner surface of said nozzle channel.

5. The injection molding apparatus of claim 1, wherein said outer surface of said valve pin is in contact with an inner surface of said nozzle channel.

6. The injection molding apparatus of claim 1, wherein said valve pin has an extended position and a retracted position, and an inlet of said valve pin melt channel selectively communicates with said manifold melt channel when said valve pin is in the retracted position.

7. The injection molding apparatus of claim 6, wherein said valve pin melt channel is restricted from communicating with said manifold melt channel when said valve pin is in the extended position.

8. The injection molding apparatus of claim 1, wherein said valve pin has an extended position and a retracted position and said mold gate is open when said valve pin is in the retracted position and is closed by said valve pin when said valve pin is in the extended position.

9. The injection molding apparatus of claim 8, wherein an inner surface of said nozzle channel aligns said valve pin with said mold gate.

10. The injection molding apparatus of claim 1, further comprising: a valve pin bushing including a bushing melt channel having an inlet and an outlet, wherein said inlet communicates with said manifold melt channel and said outlet selectively communicates with said valve pin melt channel.

11. The injection molding apparatus of claim 10, wherein said valve pin bushing includes an enlarged downstream portion positioned between said manifold and said nozzle, said bushing melt channel extending through said enlarged downstream portion.

12. The injection molding apparatus of claim 1, wherein said valve pin melt channel is a single channel such that a stream of melt material flowing within said valve pin melt channel is not divided.

13. An injection molding apparatus comprising:

a manifold having a manifold melt channel;

a nozzle coupled to said manifold, said nozzle having a nozzle channel;

a valve pin having a retracted position and being reciprocally movable through said nozzle channel to an extended position, said valve pin includes a valve pin melt channel which is defined by and substantially coaxial with said valve pin, wherein an inlet of said valve pin melt channel selectively communicates with said manifold melt channel when said valve pin is in the retracted position and is restricted from communicating with said manifold melt channel when said valve pin is in the extended position.

14. The injection molding apparatus of claim 13, wherein said valve pin melt channel is a single channel such that a stream of melt material flowing within said valve pin melt channel is not divided.

15. The injection molding apparatus of claim 13, wherein said valve pin melt channel includes a longitudinal portion and an outlet, wherein said outlet extends from said longitudinal portion of said valve pin melt channel to an outer surface of said valve pin and wherein said outlet is positioned such that said outlet is not blocked despite the position of said valve pin.

16. The injection molding apparatus of claim 15, wherein said outlet extends obliquely from said longitudinal portion of said valve pin melt channel.

17. The injection molding apparatus of claim 15, wherein said outlet extends radially from said longitudinal portion of said valve pin melt channel.

18. The injection molding apparatus of claim 13, wherein said outer surface of said valve pin is in close proximity to an inner surface of said nozzle channel.

19. The injection molding apparatus of claim 13, wherein said outer surface of said valve pin is in contact with an inner surface of said nozzle channel.

20. The injection molding apparatus of claim 13, wherein a mold gate of a mold cavity is open when said valve pin is in the retracted position and being closed by said valve pin when said valve pin is in the extended position.

21. The injection molding apparatus of claim 13, wherein an inner surface of said nozzle channel aligns said valve pin with said mold gate.

22. The injection molding apparatus of claim 13, further comprising: a valve pin bushing including a bushing melt channel having an inlet and an outlet, wherein said inlet communicates with said manifold melt channel and said outlet selectively communicates with said valve pin melt channel.

23. The injection molding apparatus of claim 22, wherein said valve pin bushing includes an enlarged downstream portion positioned between said manifold and said nozzle, said bushing melt channel extending through said enlarged downstream portion.

24. An injection molding apparatus comprising:

a manifold having a manifold melt channel;

a nozzle coupled to said manifold and having a nozzle channel;

a valve pin having a retracted position and being reciprocally axially movable through said nozzle channel of said nozzle to an extended position, wherein said valve pin includes a valve pin melt channel substantially including a longitudinal portion defined by and coaxial with said valve pin and an outer surface in close proximity to an inner surface of said nozzle channel, wherein an inlet of said valve pin melt channel selectively communicates with said manifold melt channel when said valve pin is in the retracted position and is restricted from communicating with said manifold channel when said valve pin is in the extended position; and a mold gate to a mold cavity, wherein said mold gate is open when said valve pin is in the retracted position and is closed by a valve pin tip of said valve pin when said valve pin is in the extended position, wherein said valve pin melt channel includes an outlet extending from said longitudinal portion of said valve pin melt channel to said outer surface of said valve pin, wherein said outlet is adjacent to said valve pin tip and is positioned such that said outlet is not blocked despite the position of said valve pin.

25. The injection molding apparatus of claim 24, wherein said outlet extends obliquely from said longitudinal portion of said valve pin melt channel.

26. The injection molding apparatus of claim 24, wherein said outlet extends radially from said longitudinal portion of said valve pin melt channel.

27. The injection molding apparatus of claim 24, further comprising: a valve pin bushing having a bushing melt channel for joining said manifold melt channel and said valve pin melt channel.

28. The injection molding apparatus of claim 27, wherein said valve pin bushing includes an enlarged downstream portion positioned between said manifold and said nozzle, said bushing melt channel extending through said enlarged downstream portion.

29. The injection molding apparatus of claim 24, wherein said nozzle channel aligns said valve pin with said mold gate.

30. The injection molding apparatus of claim 24, wherein said valve pin melt channel is a single channel such that a stream of melt material flowing within said valve pin melt channel is not divided.

31. An injection molding apparatus comprising:

a manifold having a manifold melt channel;

a nozzle having a nozzle channel, wherein said nozzle is coupled to a valve pin bushing positioned between said manifold and said nozzle, wherein said valve pin bushing has a bushing melt channel with an inlet and an outlet, wherein said inlet communicates with said manifold melt channel;

a valve pin having a retracted position and being reciprocally axially movable through said nozzle channel of said nozzle to an extended position, said valve pin including a valve pin melt channel defined by and substantially coaxial with said valve pin, wherein said valve pin melt channel selectively communicates with said outlet of said bushing melt channel when said valve pin is in the retracted position and is restricted from communicating with said outlet of said bushing melt channel when said valve pin is in the extended position; and a mold gate to a mold cavity, said mold gate being open when said valve pin is in the retracted position and being closed by a valve pin tip of said valve pin when said valve pin is in the extended position, wherein said valve pin melt channel includes an outlet extending from a longitudinal portion of said valve pin melt channel to an outer surface of said valve pin, wherein said outlet is adjacent to said valve pin tip and is positioned such that said outlet is not blocked despite the position of said valve pin.

32. The injection molding apparatus of claim 31, wherein said valve pin bushing includes an enlarged downstream portion positioned between said manifold and said nozzle, said bushing melt channel extending through said enlarged downstream portion.

33. The injection molding apparatus of claim 31, wherein said nozzle channel aligns said valve pin with said mold gate.

34. The injection molding apparatus of claim 31, wherein said outlet extends obliquely from said longitudinal portion of said valve pin melt channel.

35. The injection molding apparatus of claim 31, wherein said outlet extends radially from said longitudinal portion of said valve pin melt channel.

36. The injection molding apparatus of claim 31, wherein said valve pin melt channel is a single channel such that a stream of melt material flowing within said valve pin melt channel is not divided.

37. The injection molding apparatus of claim 31, wherein said outer surface of said valve pin is in close proximity to an inner surface of said nozzle channel.

38. The injection molding apparatus of claim 31, wherein said outer surface of said valve pin is in contact with an inner surface of said nozzle channel.

* * * * *